(12) United States Patent
Kelly

(10) Patent No.: US 10,606,720 B2
(45) Date of Patent: Mar. 31, 2020

(54) AUTOMATIC QUBIT CALIBRATION

(71) Applicant: Google LLC, Mountain View, CA (US)

(72) Inventor: Julian Shaw Kelly, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 138 days.

(21) Appl. No.: 15/948,490

(22) Filed: Apr. 9, 2018

(65) Prior Publication Data

US 2018/0225186 A1    Aug. 9, 2018

Related U.S. Application Data

(63) Continuation of application No. 15/178,136, filed on Jun. 9, 2016, now Pat. No. 9,940,212.

(51) Int. Cl.
*G06F 11/00* (2006.01)
*G06F 11/22* (2006.01)
*G06N 10/00* (2019.01)
*G06F 15/82* (2006.01)

(52) U.S. Cl.
CPC .......... *G06F 11/2236* (2013.01); *G06F 11/00* (2013.01); *G06F 11/2247* (2013.01); *G06F 11/2273* (2013.01); *G06F 15/82* (2013.01); *G06N 10/00* (2019.01)

(58) Field of Classification Search
CPC ............. G06F 11/2236; G06F 11/2247; G06F 11/2273
See application file for complete search history.

(56) References Cited

U.S. PATENT DOCUMENTS 6,803,599 B2 *  10/2004  Amin ............... B82Y 10/00
                                             257/31
7,830,695 B1    11/2010  Moon
9,614,532 B1     4/2017  Bulzacchelli
(Continued)

FOREIGN PATENT DOCUMENTS

JP     H05-053815     10/2012
JP     2016-515233     5/2016

OTHER PUBLICATIONS

Bialczak et al., "Quantum Process Tomography of a Universal Entangling Gate Implemented with Josephson Phase Qubits," arXiv:0910.1118v1 [quant-ph], Oct. 2009, 19 pages.
(Continued)

*Primary Examiner* — Charles Ehne
(74) *Attorney, Agent, or Firm* — Fish & Richardson P.C.

(57) ABSTRACT

Methods and apparatus for automatic qubit calibration. In one aspect, a method includes obtaining a plurality of qubit parameters and data describing dependencies of the plurality of qubit parameters on one or more other qubit parameters; identifying a qubit parameter; selecting a set of qubit parameters that includes the identified qubit parameter and one or more dependent qubit parameters; processing one or more parameters in the set of qubit parameters in sequence according to the data describing dependencies, comprising, for a parameter in the set of qubit parameters: performing a calibration test on the parameter; and performing a first calibration experiment or a diagnostic calibration algorithm on the parameter when the calibration test fails.

20 Claims, 6 Drawing Sheets

(56) References Cited

U.S. PATENT DOCUMENTS

| | | | |
|---|---|---|---|
| 2003/0224944 A1* | 12/2003 | Il'ichev | B82Y 10/00 505/170 |
| 2008/0274898 A1* | 11/2008 | Johnson | G06N 10/00 505/190 |
| 2009/0259905 A1 | 10/2009 | Silva | |
| 2014/0164313 A1 | 6/2014 | Alboszta | |
| 2014/0291490 A1 | 10/2014 | Hanson | |
| 2015/0150074 A1 | 5/2015 | Nolan | |
| 2016/0055421 A1* | 2/2016 | Adachi | G06N 5/003 706/46 |
| 2017/0017894 A1 | 1/2017 | Lanting | |

OTHER PUBLICATIONS

Branczyk et al., "Self-calibrating Quantum State Tomography," arXiv:1112.4492v2 [quant-ph], Aug. 2012, 13 pages.

Chow et al., "Complete universal quantum gate set approaching fault-tolerant thresholds with superconducting qubits," arXiv:1202.5344v1 [quant-ph], Feb. 2012, 13 pages.

Chow et al., "Randomized benchmarking and process tomography for gate errors in a solid-state qubit," arXiv:0811.4387v1 [cond-mat.mes-hall], Nov. 2008, 6 pages.

Córcoles et al., "Process verification of two-qubit quantum gates by randomized benchmarking," arXiv:1210.7011v2 [quant-ph], Nov. 2012, 9 pages.

Cramer et al. "Repeated quantum error correction on a continuously encoded qubit by real-time feedback," arXiv preprint arXiv 1508.01388v2, Apr. 10, 2016,, May 1, 2016, 23 pages.

International Search Report and Written Opinion in International Application No. PCT/US2016/067467, dated Apr. 5, 2017, 13 pages.

Kelly et al. "Scalable in-situ qubit calibration during repetitive error detection," arXiv preprint arXiv 1603.03082v1, Mar. 9, 2016, 5 pages.

Kimmel et al., "Robust Calibration of a Universal Single-Qubit Gate-Set via Robust Phase Estimation," arXiv:1502.02677v2 [quant-ph], Nov. 2015, 15 pages.

Canadian Office Action in Canadian Application No. 3,026,622, dated Nov. 15, 2019, 4 pages.

Chinese Office Action in Chinese Application No. 201680087765, dated Oct. 30, 2019, 8 pages (with English translation).

JP Decision to Grant a Patent in Japanese Application No. 2018-564274, dated Jan. 23, 2020, 5 pages.

* cited by examiner

AUTOMATIC QUBIT CALIBRATION

CROSS-REFERENCE TO RELATED APPLICATION

This application is a continuation of U.S. application Ser. No. 15/178,136, filed Jun. 9, 2016, the contents of which are incorporated by reference herein.

BACKGROUND

This specification relates to quantum computing.

Large-scale quantum computers have the potential to provide fast solutions to certain classes of difficult problems. For large-scale quantum computing to be realizable, several challenges in the design and implementation of quantum architecture to control, program and maintain quantum hardware must be overcome.

SUMMARY

This specification relates to performing calibrations of qubit parameters. In particular, this specification describes methods and apparatus for automatically maintaining and calibrating qubit parameters of a system of one or more qubits involved in a quantum computation.

In general, one innovative aspect of the subject matter described in this specification can be implemented in a method that includes the actions of obtaining a plurality of qubit parameters and data describing dependencies of the plurality of qubit parameters on one or more other qubit parameters; identifying a qubit parameter; selecting a set of qubit parameters that includes the identified qubit parameter and one or more dependent qubit parameters; processing one or more parameters in the set of qubit parameters in sequence according to the data describing dependencies, comprising, for a parameter in the set of qubit parameters: performing a calibration test on the parameter; and performing a first calibration experiment or a diagnostic calibration algorithm on the parameter when the calibration test fails.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations performing a first calibration experiment or a diagnostic calibration algorithm on the parameter comprises: performing a first calibration experiment on the parameter when the calibration test fails; and performing a diagnostic calibration algorithm on the parameter when the first calibration experiment fails due to errors that are not attributable to the parameter.

In some implementations the method further comprises performing a second calibration experiment on the parameter when the first calibration experiment fails due to errors that are attributable to the parameter; aborting the processing of the one or more parameters in the set of qubit parameters in sequence when the second calibration experiment fails; and flagging the parameter as a parameter that is within specification when the parameter passes any of the calibration test or first calibration experiment.

In some implementations the plurality of qubit parameters and the data describing dependencies of the plurality of qubit parameters on one or more other qubit parameters are represented by a directed graph comprising a node for each qubit parameter and a directed edge for each dependency; identifying a qubit parameter comprises identifying a qubit parameter that corresponds to a root node; selecting a set of qubit parameters that includes the identified qubit parameter and one or more dependent qubit parameters comprises selecting a set of qubit parameters that includes the qubit parameter that corresponds to the root node and the qubit parameters of each descendant node, wherein the set of qubit parameters is ordered according to a node ancestry ordering; and processing one or more parameters in the set of qubit parameters in sequence according to the data describing dependencies comprises processing one or more parameters in the set of qubit parameters in sequence according to the node ancestry ordering.

In some implementations performing a diagnostic calibration algorithm on the parameter comprises: iteratively performing one or more of the first calibration experiment and second calibration experiment on the qubit parameter and qubit parameters that correspond to an ancestor node of the node of the qubit parameter until the qubit parameter and qubit parameters that correspond to an ancestor node of the node of the qubit parameter are determined to be within specification or the process is aborted, the iteratively performing comprising, for each iteration: performing the first calibration experiment on the qubit parameter; in response to determining the qubit parameter passes the first calibration experiment, flagging the parameter as a parameter that is within specification; and in response to determining the qubit parameter fails the first calibration experiment due to errors that are not attributable to the parameter, selecting an ancestor parameter as the qubit parameter.

In some implementations the method further comprises in response to determining the qubit parameter fails the first calibration experiment due to errors that are attributable to the parameter, performing the second calibration experiment on the qubit parameter; in response to determining the qubit parameter passes the second calibration experiment, flagging the parameter as a parameter that is within specification; and in response to determining the qubit parameter fails the second calibration experiment, aborting the processing of the parameters in the set of qubit parameters.

In some implementations errors that are not attributable to the parameter comprise errors that are attributable to ancestor parameters.

In some implementations the directed graph is acyclic.

In some implementations the directed graph is cyclic.

In some implementations the number of iterations between co-dependent parameters in the selected set of qubit parameters is capped to a predetermined threshold.

In some implementations the obtained data further comprises one or more attributes of the parameters in the set of qubit parameters including (i) a respective timeout period for which a calibration is to be performed, and (ii) acceptable thresholds for parameter values.

In some implementations the calibration test comprises pass and fail criteria for determining when a parameter is out of specification.

In some implementations the calibration test passes if a successful first or second calibration experiment has been performed on a parameter within a respective timeout period.

In some implementations the calibration test fails if a parameter dependence has been recalibrated within a predetermined amount of time.

In some implementations the calibration test fails if a parameter dependence fails the calibration test.

In some implementations the first calibration experiment comprises one or more qubit experiments with respective measurement outcomes that are used to determine when a parameter is out of specification.

In some implementations the first calibration experiment fails if the measurement outcomes of the qubit experiments comprise parameter values that are out of specification.

In some implementations the second calibration experiment comprises one or more qubit experiments with respective measurement outcomes that are used to update the value of a parameter.

In some implementations the second calibration experiment requires more time or more hardware to complete than the first calibration experiment.

In some implementations the directed graph comprises a node for multiple parameters that are calibrated simultaneously.

In some implementations the root node comprises a root node whose corresponding qubit parameter fails the calibration test.

In some implementations the diagnostic calibration algorithm is data driven.

In some implementations processing one or more parameters in the set of qubit parameters in sequence according to the data describing dependencies comprises processing each parameter in the set of qubit parameters in sequence according to the data describing dependencies.

The subject matter described in this specification can be implemented in particular ways so as to realize one or more of the following advantages.

Operating a physical qubit in a useful capacity requires the careful calibration of qubit parameters. Since the number of qubit parameters required to operate a physical qubit can easily reach over fifty parameters, efficient and effective qubit calibration is a challenging task, particularly when considering quantum computing systems that include multiple qubits. Qubit calibrations may be bootstrapped from no specific knowledge of qubit parameters to a completely calibrated qubit. In addition, qubit calibrations are not stable and may have to be repeatedly performed during the course of one or more quantum computations, thus increasing the complexity of the task of calibrating qubits.

A system implementing automatic qubit calibration may efficiently and effectively perform qubit calibration, thus increasing the reliability and performance of a system of one or more physical qubits, in turn improving the reliability and performance of quantum computations.

A system implementing automatic qubit calibration performs different qubit calibration methods at varying computational costs to determine whether a qubit parameter is functioning correctly or not and to correct a qubit parameter that is not functioning correctly. The system effectively and efficiently monitors a system of qubits and applies appropriate, cost effective procedures to correct qubits that are not operating properly, thus achieving improved computational performance and reduced costs associated with performing qubit calibration compared to systems that do not implement automatic qubit calibration.

Furthermore, a system implementing automatic qubit calibration systematically performs the different calibration methods at varying computational costs on the qubits, taking into account the dependencies of each qubit parameter on other qubit parameters. The systematic approach improves the computational efficiency of a system implementing automatic qubit calibration compared to other systems that do not implement automatic qubit calibration, since the performance of unnecessary qubit calibration procedures or complete qubit resets are avoided whilst high levels of control and reliability are maintained.

A system implementing automatic qubit calibration utilizes known information about qubit parameters to calibrate the qubit parameters, improving the quality of the calibration procedure and reducing the time required to successfully calibrate a qubit parameter compared to systems that do not implement automatic qubit calibration.

A system implementing automatic qubit calibration may be robust to errors. When errors are encountered, the system fixes the errors and saves information regarding the context of the calibration procedure used to fix the error. Unnecessary work and calibration is therefore avoided.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Operating physical qubits in a useful capacity requires the calibration of many qubit parameters, e.g., more than fifty qubit parameters per qubit, some or all of which may depend on other qubit parameters and their calibrations. This specification describes an architecture and method for automatically calibrating multiple qubit parameters. The architecture and methods model the system of qubit parameters and their dependencies on one another using a directed graph comprising nodes and directed edges, each node corresponding to a qubit parameter and each directed edge indicating a dependency of one qubit parameter on another. A maintain qubit calibration procedure and a diagnostic qubit calibration procedure may be performed automatically according to the directed graph, that is according to the qubit parameter dependencies, in order to monitor the values of the qubit parameters and correct any qubits whose values are out of specification.

Example Operating Environment

Figure 1:
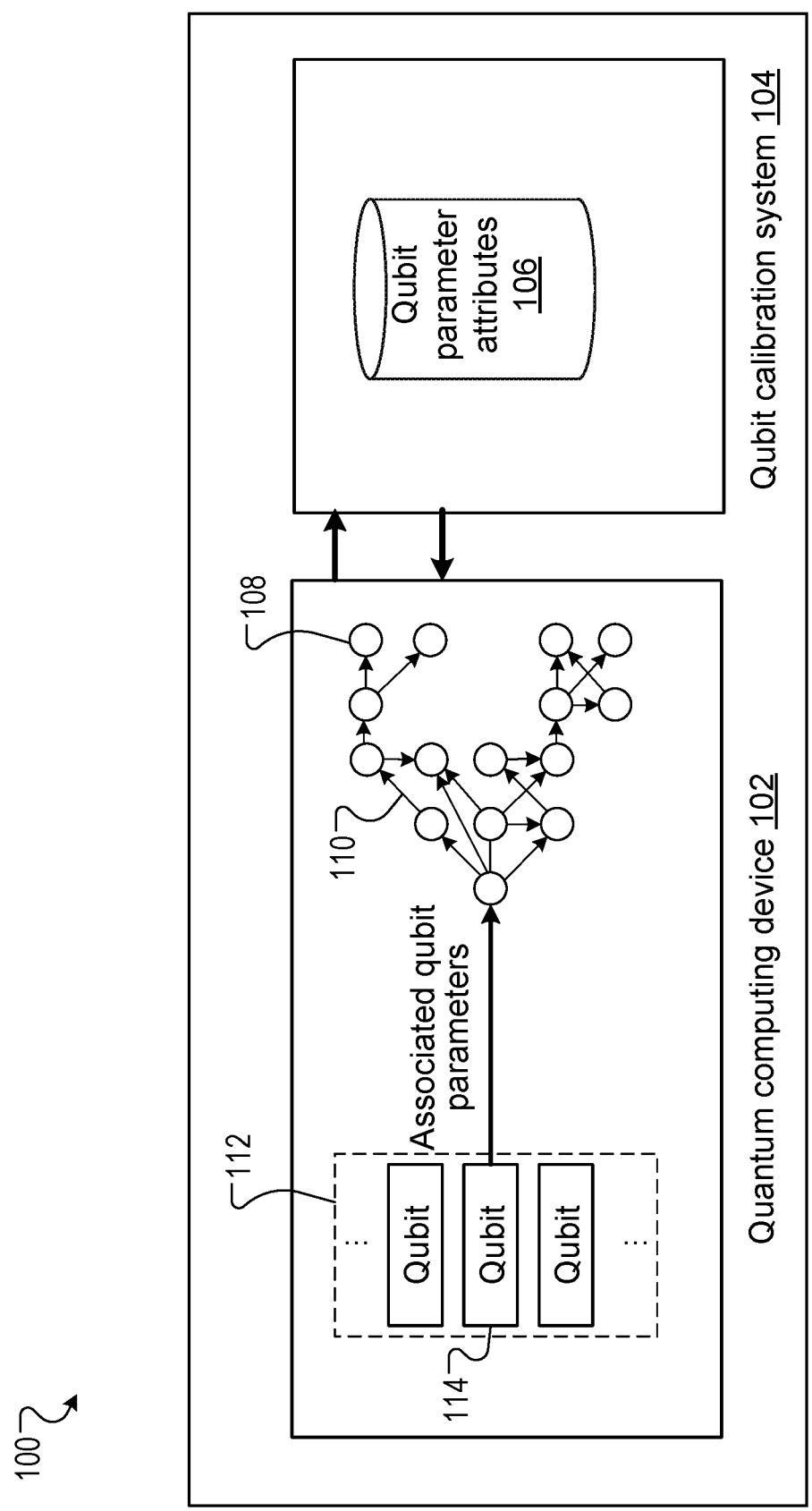
FIG. 1 depicts an example system for automatic qubit calibration.

FIG. 1 depicts an example system 100 for automatic qubit calibration. The example system 100 is an example of a system implemented as classical or quantum computer programs on one or more classical computers or quantum computing devices in one or more locations, in which the systems, components, and techniques described below can be implemented.

The system includes a quantum computing device 102 in communication with a qubit calibration system 104 and a qubit and parameter attribute data store 106. The qubit calibration system 104 is also in communication with the qubit and parameter attribute data store 106.

The quantum computing device includes one or more qubits 112. The one or more qubits may be used to perform algorithmic operations or quantum computations. The specific realization of the one or more qubits depends on the type of algorithmic operations or quantum computations that the quantum computing device is performing. For example, the qubits may include qubits that are realized via atomic, molecular or solid-state quantum systems. In other examples the qubits may include, but are not limited to, superconducting qubits or semi conducting qubits. For clarity, three qubits are depicted in FIG. 1, however the system may include a larger number of qubits.

Each qubit may be associated with multiple qubit parameters. Qubit parameters may include values used in a parameterized quantum gate, e.g., voltage amplitude for a pi pulse or frequency of a readout pulse. For example, to tune a superconducting qubit, e.g., dispersively coupled to a readout resonator, using pi and pi/2 rotations and single shot readout to discriminate between the 0 and 1 states, the superconducting qubit may be associated with multiple parameters including: readout pulse frequency, readout pulse length, readout pulse power, readout discrimination threshold to discriminate between the 0 and 1 states based on the readout signal, pi rotation qubit frequency, pi/2 rotation qubit frequency, pi pulse length, pi/2 pulse length, pi pulse amplitude and pi/2 pulse amplitude. Some or all of the parameters associated with a qubit may require experimental determination. For example, in the above list of qubit parameters, the readout pulse frequency, readout pulse power, readout discrimination threshold to discriminate between the 0 and 1 states based on the readout signal, pi rotation qubit frequency, pi/2 rotation qubit frequency, pi pulse amplitude and pi/2 pulse amplitude may require experimental determination. Other parameters may be set a priori.

The multiple qubit parameters may in turn be associated with one or more parameter attributes. The parameter attributes are dependent on the physical realization of the respective qubit. For example, the parameter attributes for a qubit parameter may include acceptable values of the qubit parameter, e.g., acceptable values used in a parameterized quantum gate. If a qubit parameter value is determined to be an acceptable value, or if the qubit parameter value is determined to lie within a tolerance value of what is accepted, the qubit parameter may be determined as being within specification. If a qubit value is determined to be an unacceptable value, the qubit parameter may be determined as being out of specification. For example, a pi pulse parameter may be determined to be in specification if the rotation angle is within the tolerance value of 1% of a 180 degree rotation. A qubit parameter that is out of specification may require calibration in order to ensure that the qubit parameter is within specification.

In another example, the parameter attributes for a qubit parameter may include a measure of the stability of the parameter, or the drift time of the parameter. After calibration, a qubit parameter may naturally drift out of specification due to external factors such as temperature. The parameter attributes may therefore include a respective timeout period which indicates a time period for which a parameter value should be checked or calibrated.

As another example, the parameter attributes for a qubit parameter may include the dependencies of a qubit parameter on other qubit parameters. A qubit parameter may depend on at least one other qubit parameter and the calibration of the at least one other qubit parameter. For example, the qubit may be an atom and the parameters of the qubit may be calibrated using Rabi driving. There may be a number of parameters which must be previously calibrated for Rabi driving to run correctly. For example, Rabi driving may need to be performed at the qubit frequency, which must be determined in a different experiment, and the qubit state must be measured using a readout operation which must itself be calibrated. Therefore, due to these parameter dependencies, before Rabi driving is performed, the qubit frequency calibration and readout operation should be calibrated.

The qubit parameters may be represented by a directed graph comprising a node for each parameter, e.g., node 108, and a directed edge for each dependency, e.g., directed edge 110. For example, for a superconducting qubit as described above, the readout threshold parameter to discriminate between the 0 and 1 state may be represented by a node that is connected to a node representing a pi pulse parameter with a directed edge indicating that the readout threshold parameter is dependent on the pi pulse parameter. As another example, a node that requires a pi pulse will be connected to a node that calibrated the pi pulse amplitude, since a node that requires a pi pulse may depend on a node that calibrates the pi pulse amplitude. Each node in the directed graph may have an associated parameter and one or more associated experiments that may be used to determine a correct value for the parameter associated with the node. As depicted in FIG. 1, qubit 114 may be associated with a number of qubit parameters, e.g., qubit parameter 108. For clarity a restricted number of qubit parameters, e.g., qubit parameter 108, are shown, however a qubit may be associated with a smaller or larger number of qubit parameters.

The directed graph may include one or more root node, e.g., nodes with no dependencies, which define a root or "ancestor" direction of the graph, e.g., the direction towards the root nodes with no dependencies, and a leaf or "child" direction of the graph, e.g., towards nodes that are dependent or deeper in the graph.

The qubit calibration system 104 may include a classical or quantum processing device and communicates with the quantum computing device 102. The qubit calibration system 104 may be configured to obtain a set of qubit parameters and data describing one or more attributes of the parameters in the set of qubit parameters, including dependencies of qubit parameters on one or more other qubit parameters in the set of qubit parameters, wherein the parameters and their dependencies on one another may be represented by a directed graph comprising a node for each parameter and a directed edge for each dependency. The qubit calibration system 104 may optionally store the data describing the one or more attributes of the parameters in the set of qubit parameters in a data store, e.g., qubit parameter and attributes data store 106. In some implementations the qubit calibration system 104 may receive some or all of the data describing the one or more attributes of the parameters in the set of qubit parameters from a third party external to the automatic qubit calibration system 100, e.g., through user input.

The qubit calibration system 104 may use the data describing the one or more attributes of the parameters in the set of qubit parameters to automatically calibrate the qubit parameters. For example, the qubit calibration system 104 may be configured to identify a qubit parameter, e.g., a qubit parameter that corresponds to a root node of the directed graph, select a set of qubit parameters that includes the identified qubit parameter and one or more dependent qubit parameters, e.g., the qubit parameter that corresponds to the selected node and the qubit parameters of each descendant node. The set of qubit parameters may be ordered, e.g., according to a node ancestry ordering. The qubit calibration system 104 may calibrate the parameters in the set of qubit parameters in sequence according to the ordering. A process used by the qubit calibration system 104 to perform these operations is described in more detail below with reference to FIGS. 2, 3 and 4.

The qubit calibration system 104 may be configured to perform calibration tests and calibration experiments on qubit parameters, e.g., qubit parameter 108, in order to calibrate the qubit parameters of the one or more qubits 112 included in the quantum computing device 102, e.g., qubit 114. A calibration experiment may include a single, static set of waveforms, where a single experiment may be repeated N times to gather statistics on a probability distribution of a final qubit state after the experiment. For example, a calibration experiment may include performing a pi pulse followed by a readout pulse. A calibration experiment may also include an ensemble of experiment where waveforms are altered from experiment to experiment. An example ensemble of experiments includes a Rabi scan, e.g., a series of experiments consisting of a rotation pulse followed by a readout pulse, where each experiment would have a different amplitude for the rotation pulse. Such an ensemble of experiments could be used to determine a relationship between rotation amplitude and qubit state. Performing calibration tests and calibration experiments on qubit parameters is described in more detail below with reference to FIGS. 3 and 4.

Programming the Hardware

Figure 2:
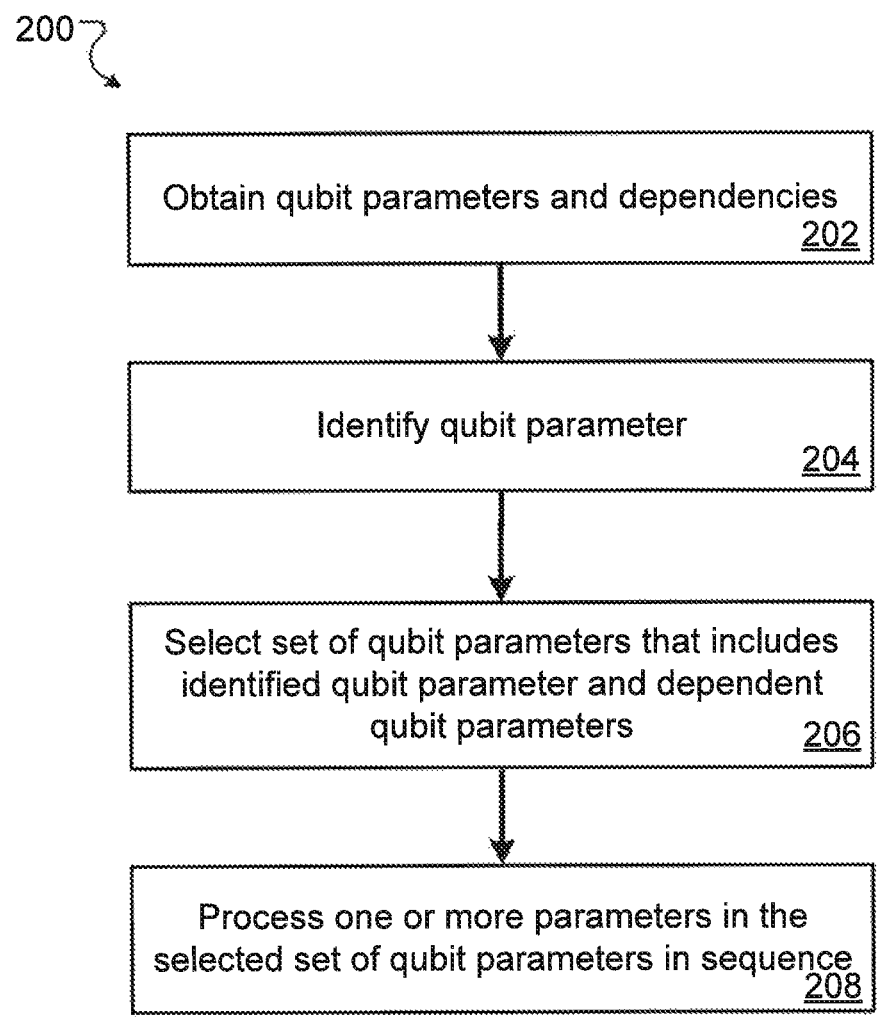
FIG. 2 is a flowchart of an example process for automatic qubit calibration.

FIG. 2 is a flowchart of an example process 200 for automatic qubit calibration. For convenience, the process 200 will be described as being performed by a system of one or more classical or quantum computing devices located in one or more locations. For example, a qubit calibration system, e.g., the qubit calibration system 104 and of FIG. 1, appropriately programmed in accordance with this specification, can perform the process 200.

The system obtains multiple qubit parameters and data describing dependencies of the multiple qubit parameters on one or more other qubit parameters (step 202). The data may also include data describing one or more attributes of the multiple parameters. The parameters and their dependencies on one another may be represented by a directed graph including a node for each parameter and a directed edge for each dependency. The directed edges for each dependency indicate a dependence of a node on a successful calibration of previous nodes. For example, a node corresponding to a pi pulse may depend on a successful calibration of at least the pi pulse amplitude. In some examples, the directed graph may include a node for multiple parameters and calibrations if related parameters are to be calibrated simultaneously.

In some implementations the directed graph may be acyclic. For example, the directed graph may be a tree with a root node and one or more descendant nodes that are reached by proceeding from parent nodes to child nodes. In other implementations the directed graph may be cyclic, for example when there are one or more co-dependent parameters.

The one or more attributes of the parameters in the obtained set of qubit parameters may further include (i) a respective timeout period for which a calibration is to be performed, and (ii) acceptable thresholds for parameter values. For example, a timeout period for which a calibration is to be performed may be determined based on the "drift time" of the parameter, that is a length of time in which the value of the parameter remains stable and does not drift out of specification. Acceptable thresholds for parameter values may vary according to the parameter type. For example, an acceptable threshold for a pi pulse may be within 1% of a 180 degree rotation. The acceptable thresholds for parameter values may be used to determine whether a parameter is out of specification, e.g., whether a measurement of a parameter is producing noise.

The system identifies a qubit parameter (step 204). For example, the identified qubit parameter may be a qubit parameter that corresponds to a root node of the directed graph. For example, the directed graph may have one root node that is selected. In other examples the directed graph may have multiple root nodes. In such a case the system may repeatedly select one of the qubit parameters that corresponds to a root node and perform the process 200 for each selected qubit parameter that corresponds to a root node. In further examples the identified qubit parameter may correspond to a most root node that has failed a calibration test, as described in more detail below.

The system selects a set of qubit parameters that includes the identified qubit parameter and one or more dependent qubit parameters (step 206). For example, the set of qubit parameters may include the identified qubit parameter that corresponds to the identified node and the qubit parameters of each descendant node. The set of qubit parameters may be ordered, e.g., according to a node ancestry ordering, that is the set of qubit parameters may be ordered in a sequence proceeding through the node dependencies, beginning with the identified root node and ending with the youngest child.

For example, if the directed graph is acyclic and includes nodes A, B, C and D, where A is the root node, node B depends on node A and nodes C and D depend on node B, the selected set of qubit parameters with node ancestry ordering may be {A, B, C, D}. In this example, an equivalent node ancestry ordering may be {A, B, D, C}.

In some implementations the directed graph is cyclic and the number of iterations between co-dependent parameters in the selected set of qubit parameters is capped to a predetermined threshold. For example, if the directed graph is cyclic and includes nodes A, B, and C, where A is the root node, node B depends on node A and node C, and node C depends on node B, in principle the number of iterations between the co-dependent parameters B and C could be indefinite, that is the selected set of qubit parameters with node ancestry ordering could be an infinite set {A, B, C, B, C, B, C, B, C, . . . }. In this situation, the system creates levels of optimization and caps the number of iterations between co-dependent parameters to a predetermined threshold. For example, the number of iterations may be capped to two and the selected set of qubit parameters with node ancestry ordering may be {A, B, C, B, C}.

The system processes one or more parameters in the set of qubit parameters in sequence according to the data describing the dependencies (step 208). In some implementations the system processes each of the parameters in the set of qubit parameters in sequence. For example, if the directed graph is acyclic and includes nodes A, B, C and D, where A is the root node, node B depends on node A, and both nodes C and D depend on node B, the system may calibrate each parameter corresponding to nodes A, B, C and D in the set of qubit parameters {A, B, C, D} in sequence according to the ordering A, B, C, D. Processing a qubit parameter in a set of qubit parameters in sequence according to an ordering is described in more detail below with reference to FIGS. 3 and 4.

Processing a Qubit Parameter

Figure 3:
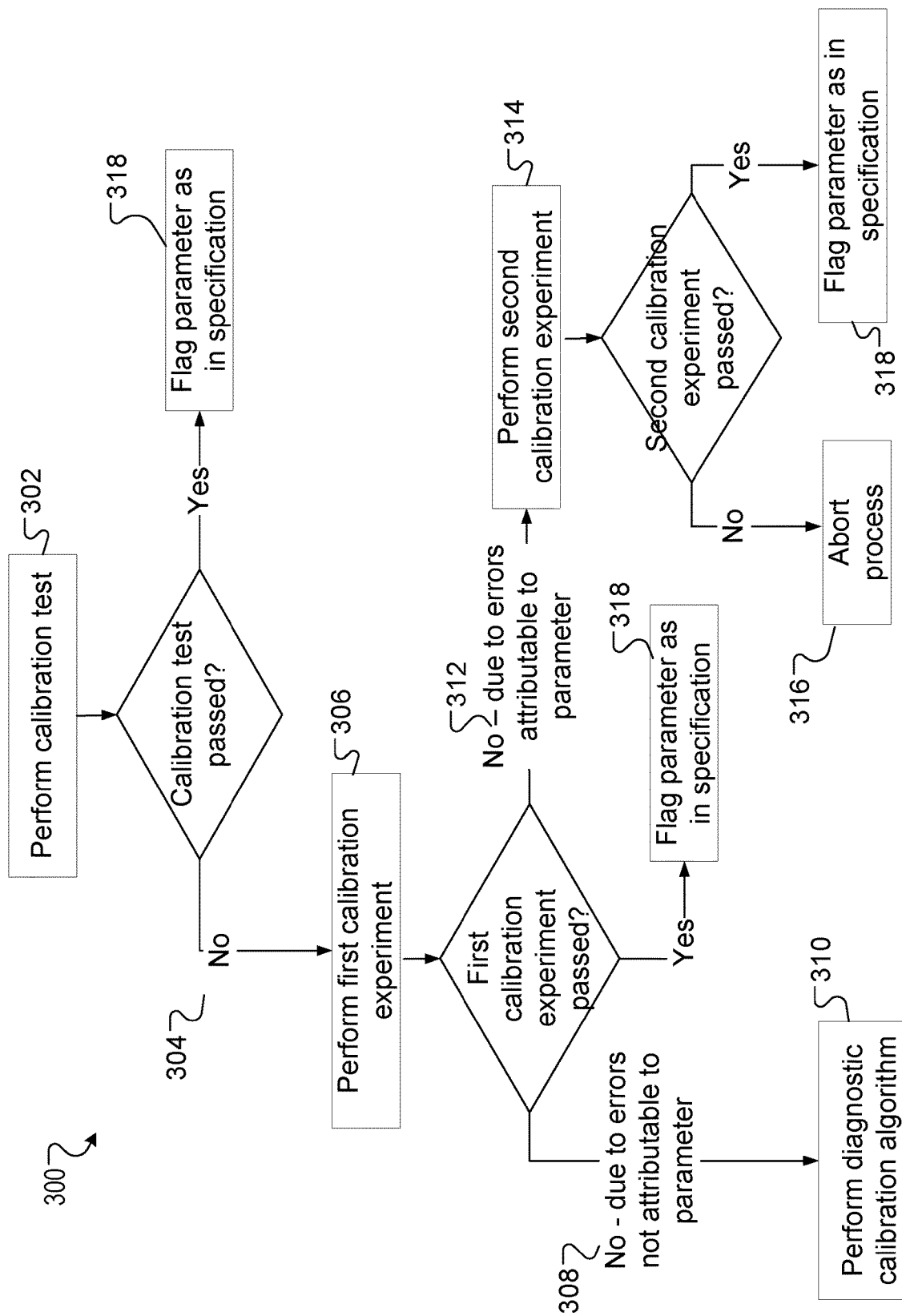
FIG. 3 is a flow diagram of an example qubit maintenance process for processing parameters in a set of qubit parameters in sequence.

FIG. 3 is a flow diagram of an example qubit maintenance process 300 for processing a parameter in a set of qubit parameters. The qubit maintenance process 300 may be performed for one or more parameters in a set of qubit parameters in sequence according to a qubit parameter ordering. For convenience, the process 300 will be described as being performed by a system of one or more classical or quantum computing devices located in one or more locations. For example, a qubit calibration system, e.g., the qubit calibration system 104 and of FIG. 1, appropriately programmed in accordance with this specification, can perform the process 300. The example process 300 may be considered a depth-first, recursive method of traversing a directed graph that represents qubit parameters and their dependencies, e.g., the process may be invoked on a node in a "leaf" or "child" direction of the graph that is to be calibrated. The process may then start investigating the node in the most "root" direction that may be likely to be out of specification based on information regarding the recent and current status of the system, and works towards the node that originally had the process invoked on it. In some examples, the process 300 may be performed as an initial system calibration, since the process naturally moves in the order of least dependent towards a most dependent node, or in some cases it may be performed when a system has been idle sometime after a recent calibration.

The system performs a calibration test on the qubit parameter (step 302). The calibration test determines whether the parameter is in or out of specification. The calibration test may include a set of metadata associated with the directed graph, and may not include performing an experiment on the qubit parameter. Rather, the calibration test may be a low cost test that may be used to determine a current state of the parameter, and in turn the current state of the system, by investigating the qubit parameter and previous calibrations. In some implementations the calibration test may include pass and fail criteria for determining when a parameter is out of specification. For example, a calibration test on a qubit parameter may pass if a successful calibration experiment has been performed on the parameter within a respective timeout period. Calibration experiments are described in detail below with reference to steps 306 and 314. In another example, a calibration test may fail if the parameter has been flagged as having failed a calibration experiment. In a further example, a calibration test may fail if a parameter dependence has been recalibrated within a predetermined amount of time, e.g., if an ancestor parameter, that is a parameter on which a current parameter depends, has been recalibrated since the current parameter itself was calibrated. As another example, a calibration test may fail if the parameter dependence has been altered within a predetermined amount of time, e.g., if the parameter now depends on a different parameter. In addition, a calibration test may fail if a parameter that depends on the parameter has failed a calibration test.

The system performs a first calibration experiment or a diagnostic calibration algorithm on the parameter when the calibration test fails. For a parameter in the set of qubit parameters for which the calibration test fails (step 304), the system performs a first calibration experiment on the parameter (step 306). A first calibration experiment may include a method on a node that runs an ensemble of experiments and uses data from the ensemble of experiments to determine a state of calibration. For example, a first calibration experiment may include one or more qubit experiments with respective measurement outcomes that are used to determine whether a parameter value is out of specification. The first calibration experiment may be a low cost ensemble of experiments, where an experiment may include an input waveform and an output of measured qubit states after applying the waveform. The first calibration experiment may be used to determine whether the qubit requires a full calibration. For example, a first calibration experiment may fail if a measurement outcome of a corresponding qubit experiment indicates parameter values that are out of specification. For example, a parameter value may be out of specification if the first calibration experiment returns noise and not an expected measurement result. Generally, a first calibration experiment may be used to answer questions about a qubit parameter, such as: is the parameter in specification? Is the first calibration experiment functioning correctly, e.g., is an ensemble of experiments functioning accurately?

For a parameter in the set of qubit parameters for which the first calibration experiment fails due to errors that are not attributable to the parameter (step 308), the system performs a diagnostic calibration algorithm on the set of qubit parameters (step 310). Errors that are not attributable to the parameter may include errors that are attributable to ancestor parameters. For example, if a parameter requires a pi pulse but a parameter on which it depends does not have a calibrated pi pulse amplitude, the parameter that requires a pi pulse may fail the first calibration experiment due to the out of specification pi pulse amplitude. Performing a diagnostic calibration algorithm on a set of qubit parameters is described in more detail below with reference to FIG. 4.

For a parameter in the set of qubit parameters for which the first calibration experiment fails due to errors that are attributable to the parameter (step 312), the system performs a second calibration experiment on the parameter (step 314). Errors that are attributable to the parameter may include drift in the control electronics or device parameters, or an ancestor parameter changing the optimal value for this parameter, e.g., the pi amplitude may change for these reasons.

A second calibration experiment may include a method on a node representing a parameter that runs an ensemble of experiments and uses the data from the experiments to update the parameter associated with the node. In some implementations the second calibration experiment is the only experiment that alters the metadata associated with the directed graph. A second calibration experiment may include one or more qubit experiments with respective measurement outcomes that are used to update the value of a parameter. The second calibration experiment may be a high cost ensemble of experiments that are used to determine a new value for the qubit parameter. The output of a second calibration experiment may be interpreted as updating a qubit parameter value. The second calibration experiment may require more time or more hardware to complete than the first calibration experiment, e.g., a first calibration experiment is of lower cost than a second calibration experiment.

For a parameter in the set of qubit parameters for which the second calibration experiment fails, the system aborts the processing of the parameters in the set of qubit parameters (step 316).

For a parameter in the set of qubit parameters that passes any of the calibration test (as described in step 302), first calibration experiment (as described in step 306) or second calibration experiment, the system flags the parameter as a parameter that is within specification (step 318), that is the value of the parameter is acceptable and does not require further action/calibration. In this situation, the system may return to step 208 described above with reference to FIG. 2, and select the next parameter in the set of qubit parameters in sequence according to the ordering. For example, if it is determined at step 318 that the qubit parameter corresponding to node A in the sequence of nodes A, B, C, D has passed any of the calibration test, first calibration experiment or second calibration experiment, the system may flag the qubit parameter corresponding to node A as being within specification, return to step 302 and perform a calibration test on node B.

Figure 4:
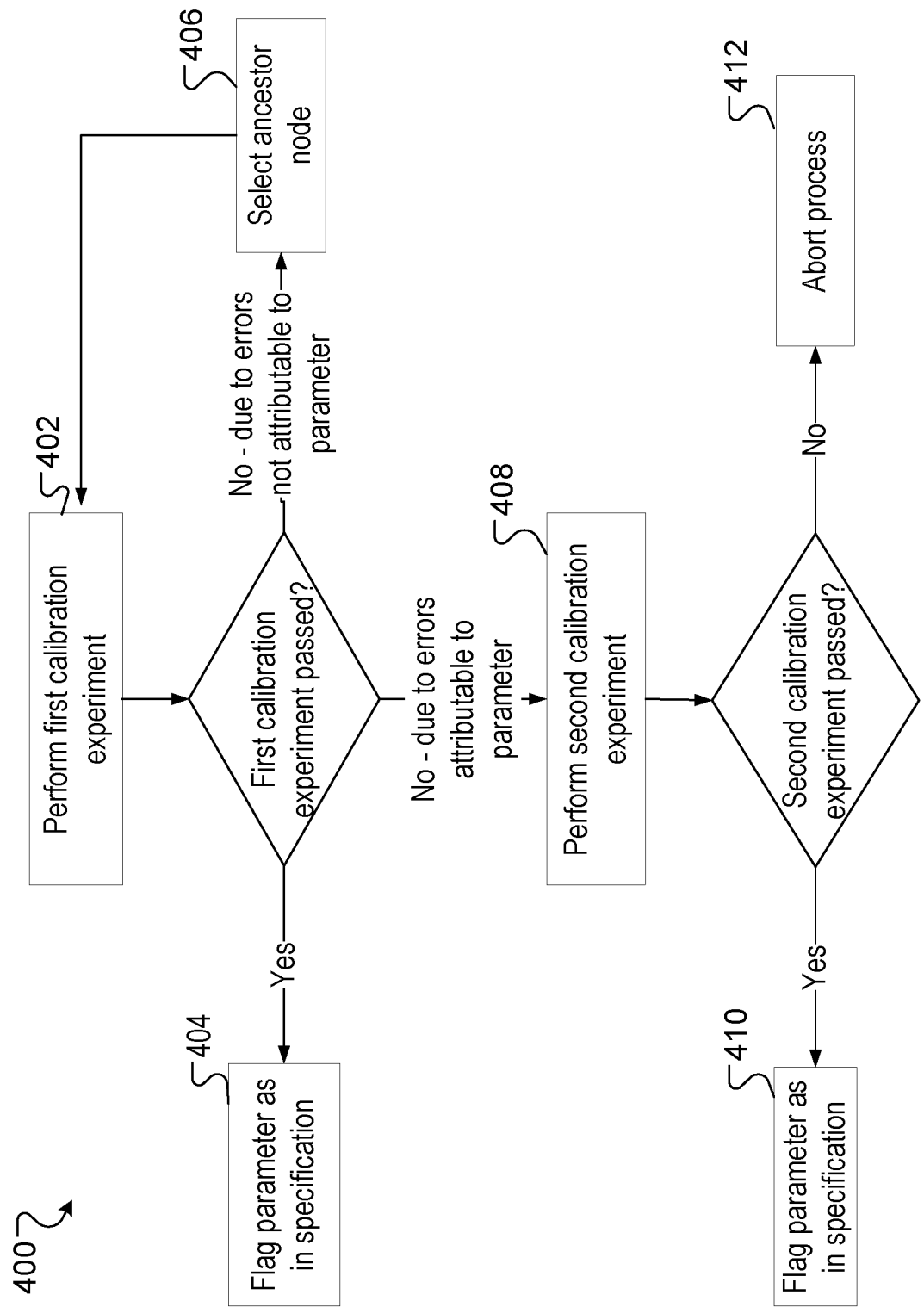
FIG. 4 is a flow diagram of an example process for qubit calibration.

FIG. 4 is a flow diagram of an example process 400 for performing a diagnostic calibration algorithm on a set of qubit parameters. For convenience, the process 400 will be described as being performed by a system of one or more classical or quantum computing devices located in one or more locations. For example, a qubit calibration system, e.g., the qubit calibration system 104 of FIG. 1, appropriately programmed in accordance with this specification, can perform the process 400. The example process 400 may traverse a directed graph that represents qubit parameters and their dependencies by starting at a particular node and working backwards through the dependencies of the node. The example process may assume that current or recent information regarding the system can no longer be trusted in a region near a node that calls the process. Therefore, the process 400 may traverse the graph entirely without the use of calibration tests and with the use of first and second calibration experiments.

The process 400 is an iterative process that includes iteratively performing one or more of the first calibration experiment and second calibration experiment on the qubit parameter and qubit parameters that correspond to an ancestor node of the node of the qubit parameter until the qubit parameter and qubit parameters that correspond to an ancestor node of the node of the qubit parameter are determined to be within specification or the process is aborted. The process 400 maybe be iteratively performed until the qubit parameters that have failed the first calibration experiment, e.g., due to errors not attributable to the parameter, and qubit parameters that correspond to an ancestor node of the node of the qubit parameter that has failed the first calibration experiment are determined to be within specification. The process 400 is a data driven diagnostic calibration algorithm.

The system performs a first calibration experiment on the qubit parameter (step 402). For example, if the directed graph is acyclic and includes nodes A, B and D, where A is the root node, node B depends on node A and node D depends on node B, where node D has failed the first calibration experiment due to errors not attributable to the parameter represented by node D, the system may perform a first calibration experiment on the qubit parameter corresponding to node D. Performing a first calibration experiment is described in more detail above with reference to FIG. 3.

The system may determine whether the first calibration experiment on the qubit parameter has passed or not. In response to determining that the qubit parameter passes the first calibration experiment, the system flags the parameter as a parameter that is within specification (step 404).

In response to determining the qubit parameter fails the first calibration experiment due to errors that are not attributable to the parameter, the system selects an ancestor parameter as the qubit parameter (step 406). Errors that are not attributable to a parameter are described above with reference to FIG. 3. Continuing the example above, if it is determined at step 406 that the qubit parameter corresponding to node D in the sequence of nodes A, B, D has failed the first calibration experiment due to errors that are not attributable to the parameter corresponding to node D, the system may select an ancestor node of node D, e.g., node B, return to step 402 and perform a first calibration experiment on the ancestor node, e.g., node B.

In some examples, if the process 400 is performed on a root node of the directed graph, e.g., a node that does not have an ancestor parameter, and it is determined at step 406 that the first calibration experiment has failed due to errors not attributable to the parameter corresponding to the root node, the system may determine a system failure.

In response to determining the qubit parameter fails the first calibration experiment due to errors that are attributable to the parameter, the system performs the second calibration experiment on the qubit parameter (step 408). For example, continuing the example above, if it is determined in that the first calibration experiment performed on the qubit parameter corresponding to node D has failed due to errors attributable to the parameter corresponding to node D, the system performs a second calibration experiment on the qubit parameter corresponding to node D. Both Errors that are attributable to a parameter and performing second calibration experiments are described above with reference to FIG. 3.

In response to determining the qubit parameter passes the second calibration experiment, the system flags the parameter as a parameter that is within specification (step 410).

In response to determining the qubit parameter fails the second calibration experiment, the system aborts the processing of the parameters in the set of qubit parameters (step 412).

Figure 5A:
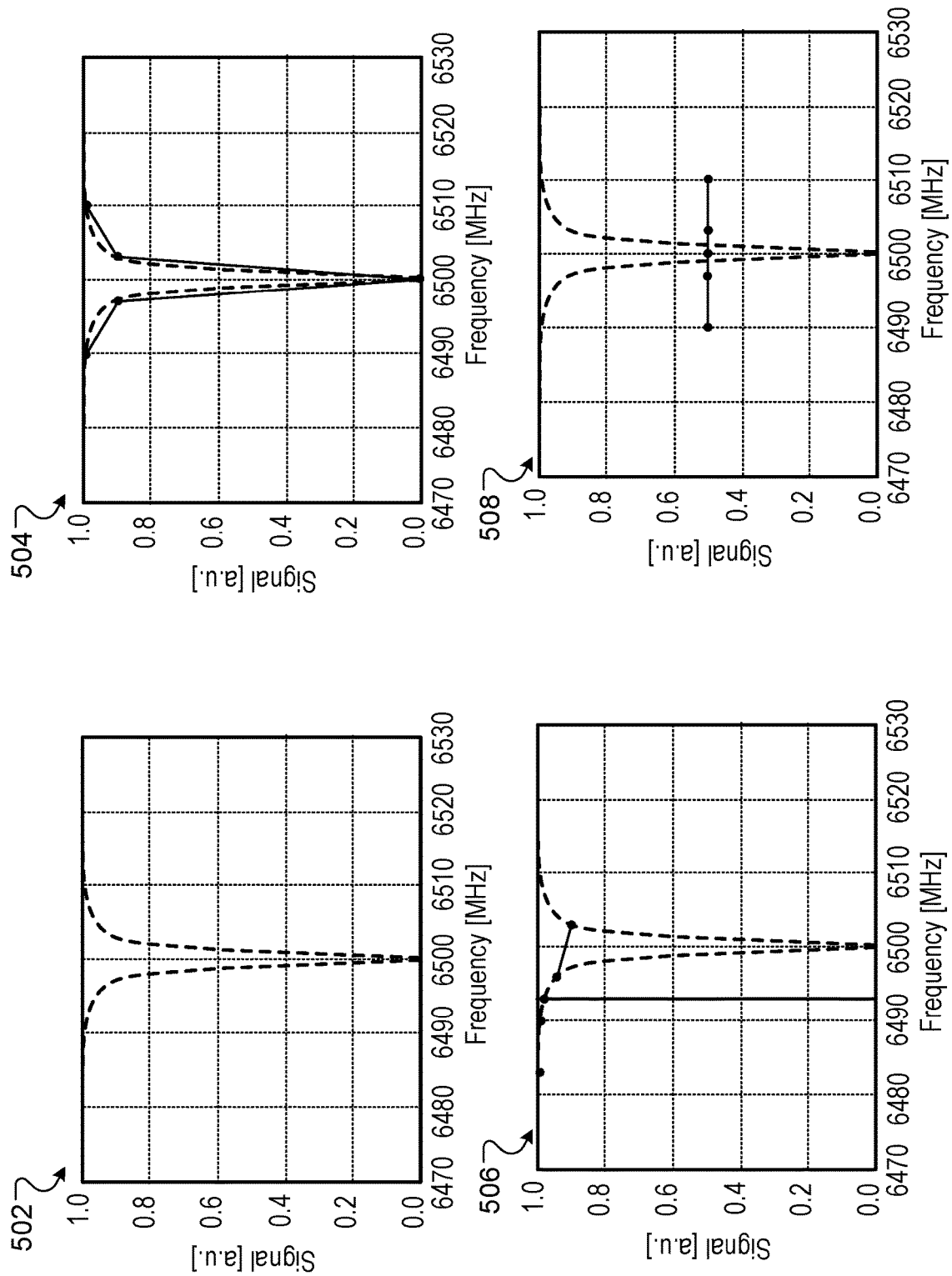
FIGS. 5A and 5B show example illustrations of calibrating a resonance frequency using a first and second calibration experiment.
Figure 5B:
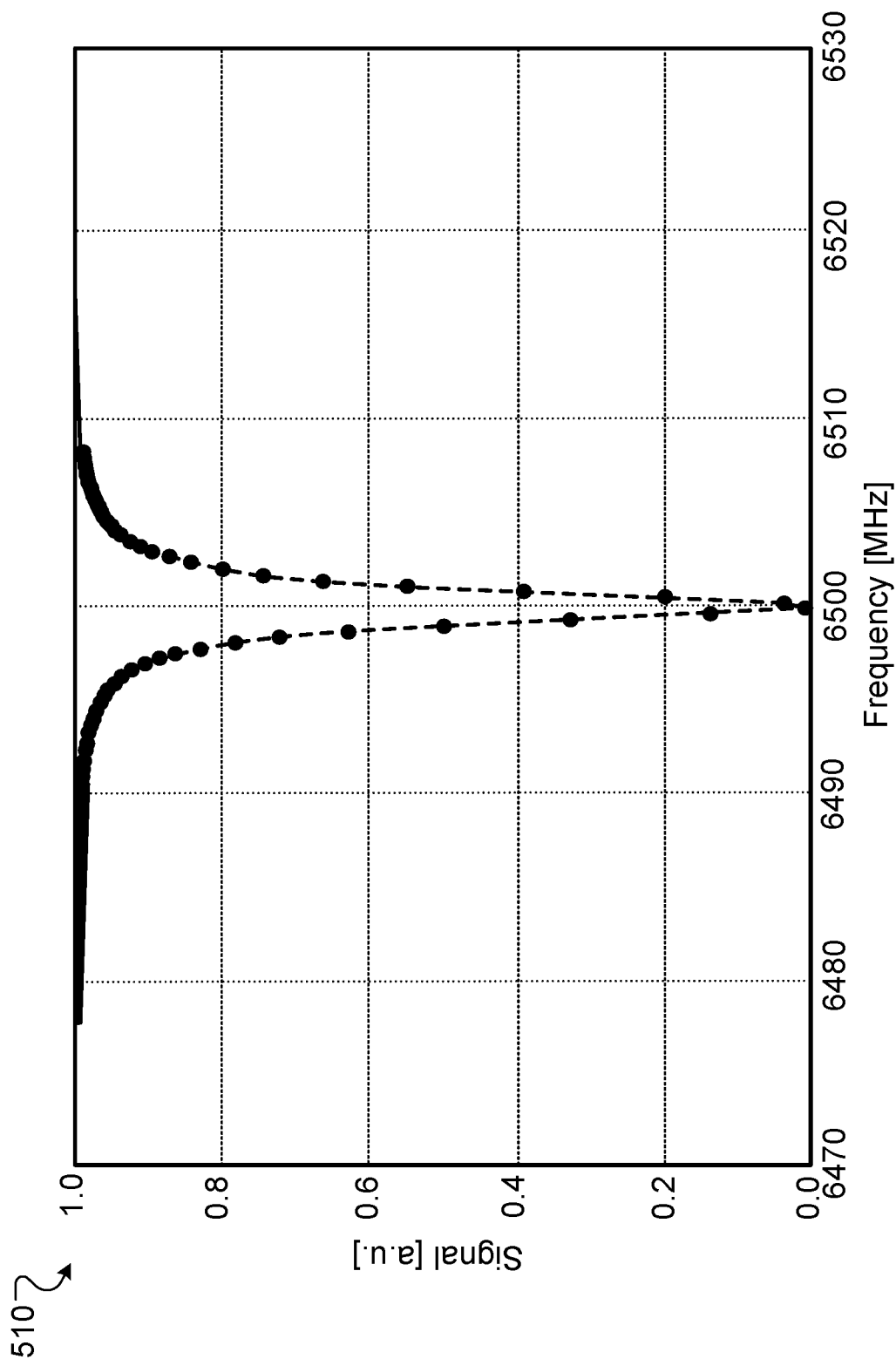

FIGS. 5A and 5B show example illustrations 502-510 of calibrating a resonance frequency using a first and second calibration experiment, as described above with reference to FIGS. 3 and 4 and as performed by a qubit calibration system, e.g., the qubit calibration system 104 of FIG. 1.

In order to determine an initial readout frequency for a qubit, it may be physically required to perform an ensemble of experiments of a readout pulse and search for a Lorentzian frequency response of the readout resonator. Illustration 502 shows an ideal Lorentzian frequency response of a readout resonator centered at 6500 MHz.

Performing a first calibration experiment to the qubit may be used to verify that the resonator frequency is within specification, e.g., within a given range around 6500 MHz, or out of specification. Since the first calibration experiment may be a low cost ensemble of experiments, instead of taking a large number of data points, the system may take a small number of data points, e.g., 5 data points using 5 experiments, centered about the expected resonance frequency of 6500 MHz. Illustration 504 illustrates 5 data points using 5 experiments. The resulting data may suggest that the resonance frequency is where it is expected to be, e.g., at or close to 6500 MHz. In this case, the first calibration experiment would return "true", e.g., the parameter has passed the first calibration experiment.

If, for example, the resonator frequency had been previously calibrated to be at 6493 MHz and the first experiment was performed, the system may produce illustration 506, wherein the circle bullets represent the outputs from the 5 experiments, as in illustration 504, and the vertical line represents the expected frequency of the resonator, e.g., 6493 MHz. In this case, the first experiment would indicate that the resonator frequency is not as expected, e.g., not at 6500 MHz, and the first calibration experiment would return "false", e.g., the parameter has failed the first calibration experiment due to errors that are not attributable to the parameter.

As another example, in some cases a readout device may not be functioning, e.g., due to faulty hardware. In this case, if the first experiment was performed, the system may produce illustration 508. The data shown in illustration 508 is nonsensical—the readout device is always returning 0.5, independent of the frequency. In this case, the first experiment would return "false", e.g., the calibration experiment failed due to errors that are not attributable to the parameter—rather the errors are attributable to the readout device. In such cases, it may not be possible to verify whether the parameter is in specification or not. In some implementations the system may assume that the parameter is not within specification.

Illustration 510 shows the results of a second calibration experiment used to calibrate the resonance frequency. As described above with reference to FIGS. 3 and 4, a second calibration experiment may include running an ensemble of experiments and using the data from the experiments to update the parameter associated with the node. Illustration 510 shows the results of performing the ensemble of experiments to determine the resonator frequency.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g., qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:

obtaining a plurality of system parameters and data describing dependencies of the plurality of system parameters on one or more other system parameters, wherein the plurality of system parameters and the data describing dependencies of the plurality of system parameters on one or more other system parameters are represented by a directed graph comprising a node for each system parameter and a directed edge for each dependency;

identifying a system parameter;

selecting a set of system parameters that includes the identified system parameter and one or more dependent system parameters, comprising selecting a set of system parameters that includes the identified system parameter and the system parameters of each descendant node, wherein the set of system parameters is ordered according to a node ancestry ordering; and calibrating one or more parameters in the set of system parameters in sequence according to the data describing dependencies, comprising calibrating one or more parameters in the set of system parameters in sequence according to the node ancestry ordering.

2. The method of claim 1, wherein the system parameters comprise qubit parameters.

3. The method of claim 1, wherein identifying the system parameter comprises identifying a system parameter that corresponds to a root node.

4. The method of claim 1, wherein calibrating one or more parameters in the set of system parameters in sequence according to the node ancestry ordering comprises, for a parameter in the set of system parameters:
performing a calibration test on the parameter; and
performing a first calibration experiment or a diagnostic calibration algorithm on the parameter when the calibration test fails.

5. The method of claim 4, wherein performing a first calibration experiment or a diagnostic calibration algorithm on the parameter comprises:
performing a first calibration experiment on the parameter when the calibration test fails; and
performing a diagnostic calibration algorithm on the parameter when the first calibration experiment fails due to errors that are not attributable to the parameter.

6. The method of claim 4, further comprising:
performing a second calibration experiment on the parameter when the first calibration experiment fails due to errors that are attributable to the parameter;
aborting the processing of the one or more parameters in the set of system parameters in sequence when the second calibration experiment fails; and
flagging the parameter as a parameter that is within specification when the parameter passes any of the calibration test or first calibration experiment.

7. The method of claim 4, wherein performing a diagnostic calibration algorithm on the parameter comprises:
iteratively performing one or more of the first calibration experiment and second calibration experiment on the system parameter and system parameters that correspond to an ancestor node of the node of the system parameter until the system parameter and system parameters that correspond to an ancestor node of the node of the system parameter are determined to be within specification or the process is aborted, the iteratively performing comprising, for each iteration:
performing the first calibration experiment on the system parameter;
in response to determining the system parameter passes the first calibration experiment, flagging the parameter as a parameter that is within specification; and
in response to determining the system parameter fails the first calibration experiment due to errors that are not attributable to the parameter, selecting an ancestor parameter as the system parameter.

8. The method of claim 7, further comprising:
in response to determining the system parameter fails the first calibration experiment due to errors that are attributable to the parameter, performing the second calibration experiment on the system parameter;
in response to determining the system parameter passes the second calibration experiment, flagging the parameter as a parameter that is within specification; and
in response to determining the system parameter fails the second calibration experiment, aborting the processing of the parameters in the set of system parameters.

9. The method of claim 7, wherein errors that are not attributable to the parameter comprise errors that are attributable to ancestor parameters.

10. The method of claim 1, wherein the directed graph is acyclic, or
wherein the directed graph is cyclic and the number of iterations between co-dependent parameters in the selected set of system parameters is capped to a predetermined threshold.

11. The method of claim 1, wherein the obtained data further comprises one or more attributes of the parameters in the set of system parameters including (i) a respective timeout period for which a calibration is to be performed, and (ii) acceptable thresholds for parameter values.

12. The method of claim 4, wherein the calibration test comprises pass and fail criteria for determining when a parameter is out of specification, and optionally wherein
the calibration test passes if a successful first or second calibration experiment has been performed on a parameter within a respective timeout period; and
the calibration test fails if (i) a parameter dependence has been recalibrated within a predetermined amount of time, or (ii) a parameter dependence fails the calibration test.

13. The method of claim 4, wherein the first calibration experiment comprises one or more system experiments with respective measurement outcomes that are used to determine when a parameter is out of specification, and wherein the first calibration experiment fails if the measurement outcomes of the system experiments comprise parameter values that are out of specification.

14. The method of claim 6, wherein the second calibration experiment comprises one or more system experiments with respective measurement outcomes that are used to update the value of a parameter.

15. The method of claim 6, wherein the second calibration experiment requires more time or more hardware to complete than the first calibration experiment.

16. The method of claim 1, wherein the directed graph comprises a node for multiple parameters that are calibrated simultaneously.

17. The method of claim 1, wherein the identified parameter comprises a root node parameter whose corresponding system parameter fails the calibration test.

18. The method of claim 3, wherein the diagnostic calibration algorithm is data driven.

19. The method of claim 1, wherein calibrating one or more parameters in the set of system parameters in sequence according to the data describing dependencies comprises calibrating each parameter in the set of system parameters in sequence according to the data describing dependencies.

20. A calibration system configured to:
obtain a plurality of system parameters and data describing dependencies of the plurality of system parameters on one or more other system parameters, wherein the plurality of system parameters and the data describing dependencies of the plurality of system parameters on one or more other system parameters are represented by a directed graph comprising a node for each system parameter and a directed edge for each dependency;
identify a system parameter;
select a set of system parameters that includes the identified system parameter and one or more dependent system parameters, comprising selecting a set of system parameters that includes the identified system parameter and the system parameters of each descendant node, wherein the set of system parameters is ordered according to a node ancestry ordering; and calibrate one or more parameters in the set of system parameters in sequence according to the data describing dependencies, comprising calibrating one or more parameters in the set of system parameters in sequence according to the node ancestry ordering.

* * * * *